United States Patent [19]
Rowekamp

[11] 3,886,998
[45] June 3, 1975

[54] COMBINATION SOLAR WATER HEATER AND CHILLER

[76] Inventor: Richard J. Rowekamp, 3626 Glenmore Ave., Cincinnati, Ohio 45211

[22] Filed: Sept. 6, 1973

[21] Appl. No.: 394,789

[52] U.S. Cl. .................. 165/2; 126/271; 126/400; 165/49; 237/1 A
[51] Int. Cl. .......................................... F25b 13/00
[58] Field of Search ............ 126/400, 271; 237/1 A; 165/18, 104, 48, 49, 2; 62/437

[56] References Cited
UNITED STATES PATENTS

| | | | |
|---|---|---|---|
| 2,705,948 | 4/1955 | Rostock | 126/271 |
| 2,838,043 | 6/1958 | Bliss | 126/271 |
| 2,843,536 | 7/1958 | Mount | 126/271 |
| 3,018,087 | 1/1962 | Steele | 126/271 |
| 3,250,269 | 5/1966 | Sherock | 126/271 |
| 3,277,884 | 10/1966 | Rowekamp | 126/271 |
| 3,400,249 | 9/1968 | Mekjean | 126/400 |
| 3,799,145 | 3/1974 | Butterfield | 126/271 |

OTHER PUBLICATIONS

Oct., 1955, "Air Conditioning, Heating and Ventilating," Bliss, pp. 92–97.

Primary Examiner—Manuel A. Antonakas
Assistant Examiner—Daniel J. O'Connor
Attorney, Agent, or Firm—James W. Pearce; Roy F. Schaeperklaus

[57] ABSTRACT

This invention relates to a method and an apparatus which can be used either to heat or cool water through solar technology merely by the addition or removal of a few materials from a basic structure, thus making it possible to expose water to sunlight in winter so as to provide hot water for heating buildings, or to chill water by exposing it to cold night air during summer so as to cool the same buildings. The basic object is to reduce the cost of hot and cold water thus produced by using what is essentially a water chiller as a basic structure, and then adding to it during winter a glass panel at the top and an insulating panel at the bottom so the device can be converted into a solar water heater. Also provided are ways for heating or cooling several small houses or one very large building through the use of automatic controls, large storage tanks, and an enclosed collector area located in the backyard and in the midst of several houses so that it is not necessary to mount the devices on the roof of the buildings themselves, as has been the practice in most solar energy projects.

9 Claims, 17 Drawing Figures

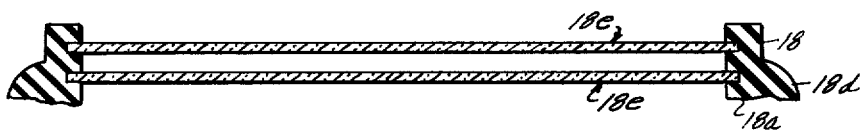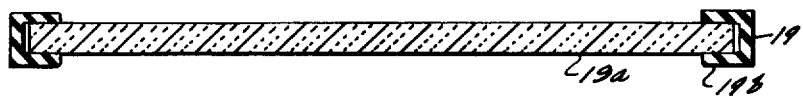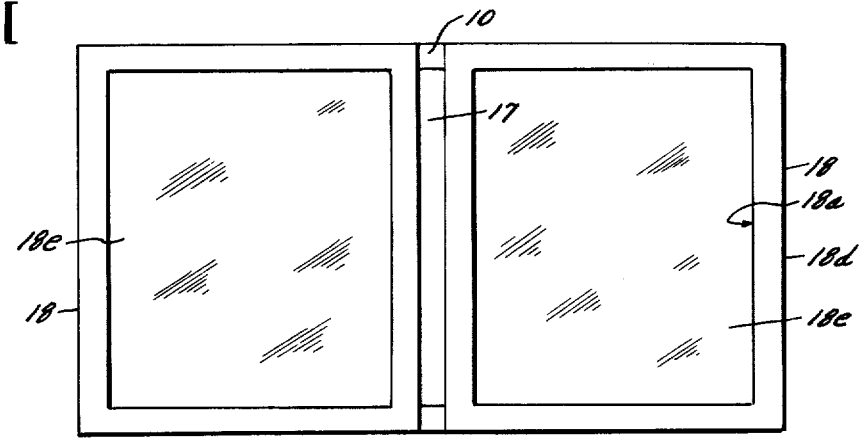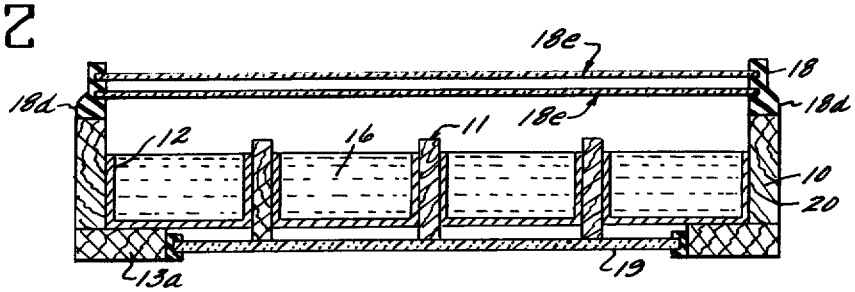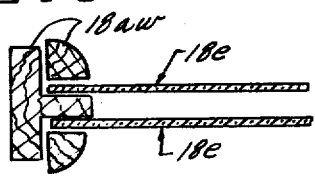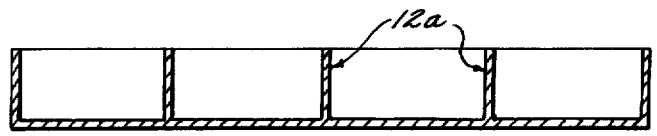

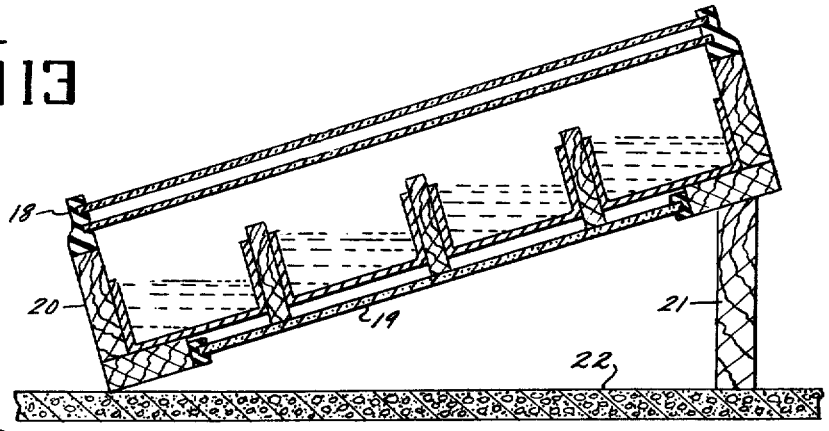
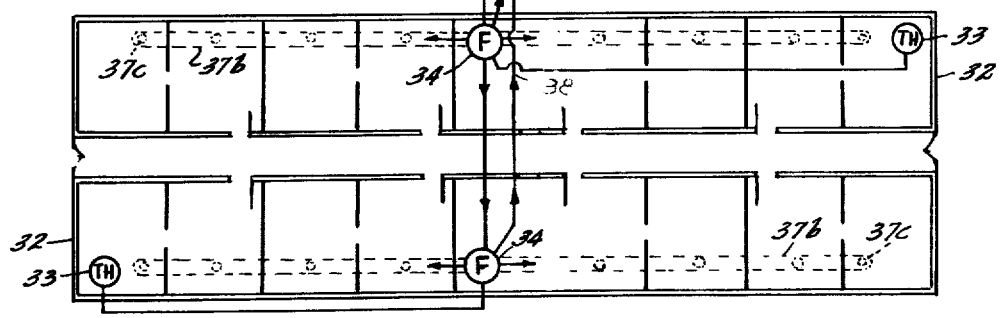
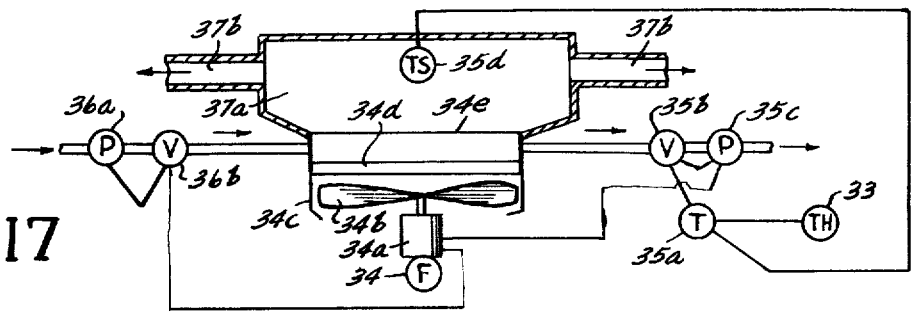

COMBINATION SOLAR WATER HEATER AND CHILLER

If sunlight is to become appealing as a commercial source of energy, the cost of the devices which collect it must be reduced to a bare minimum. The prime objective of this invention is to provide such an economical apparatus, which in effect would be a combination solar water heater and chiller, capable of heating and cooling buildings. To accomplish this, I have designed a chiller as a basic structure, which is constructed of the same shallow trays as is described in my U.S. Pat. Nos. 3349573 and 3293872 for desalting ocean water by freezing, except that the shallow trays are arranged in banks of four and separated from each other by a wood divider, and except that all are contained within a wood frame which acts as the structural support for the entire assembly. To this chiller, or basic structure, is added a glass panel and an insulating panel, which converts the chiller into a solar water heater.

An object of this invention is to design a chiller which can also be used as a solar water heater. This requires a reduction in the width of the solar trays which I have used for desalting ocean water by freezing through exposure to the frigid air of the atmosphere in winter; preferably the desalting trays would be one to two feet wide so they can carry as much ocean water as possible. But such wide trays are not suitable for a solar water heater, since they must be tilted at a rather sharp angle toward the Sun during winter when it is far off in the southern skies; under such conditions, all the water in a wide tray would pool up at the lower end, while better than three-fourths of the tray would expose only bare metal to sunlight. This would result in little heated water for the amount of metal involved; — it would be wasteful, uneconomical, and impractical. Therefore, a narrow and shallow tray must be employed — about 5 inches in width; and a bank of four such trays, as shown on the drawings, has proven very practical in tests and experiments which I have conducted.

Another object of this invention is to disclose a novel method whereby, through the employment of numerous such devices within a fenced area in the backyard of several homes or a commercial building, a maintenance specialist could be hired to repair and operate all the solar equipment; and hot and cold water could be sold to customers by a solar public utility company. Most solar devices invented to date are so designed that they become a part of the structure which they usually will heat only; — few provide cooling. This means that the owner of the building must maintain and operate the devices. Since most homeowners are not technically oriented, nor do they have the time to properly maintain such devices, most solar projects are annoying and objectionable to the owner. In this new approach for both heating and cooling homes, all the energy would be produced within an enclosed area where the devices would be safeguarded from damage, and where a maintenance man could see that all the equipment is working properly, thus assuring the homeowners of continuous year-round comfort, without the worry and trouble with complicated equipment which they themselves are unsuited to operate and maintain.

Still another object of this invention is to design a combination solar water heater and chiller which employs a very minimum of cheap materials, but which also has the structural strength to support the weight of approximately 15 gallons of water (125 pounds). I envision each device as being 8 foot long, 2 feet wide, and only 3½ inches high, as a chiller; — 5 inches high as a solar water heater; and each would be filled with about 15 gallons of water. At the present time, wood is far cheaper than metals or plastics, and affords the structural strength to support 125 pounds of water; therefore, wood is shown on the drawings; and it is the actual intent to use a 2 inches × 4 inches wood frame, which is really only 1½ inches × 3½ inches in its cut size. However, it is to be pointed out that metal or plastics could be used if they prove to be economical or practical. It is intended that a very thin gage aluminum sheet will be used to make the narrow shallow pans; this will reduce material and manufacturing costs; but to keep the pans from being broken or distorted by the weight of the water, a wood divider will be run longitudinally between all four pans to support them, because when the water heater is tilted toward the Sun a considerable weight is pressing downward due to the slant. To brace the aluminum trays from the bottom, four wood supports are used as shown on the drawings, and each will be routed out so the wood dividers will slip into them and be held firmly in place. In selecting the materials and design for the materials which convert the chiller into a solar water heater, the entire theme of economy is carried out. the frame for the glass panel is made of rubber which is extruded in one piece and containing the rabbet which will hold the glass panes; and the insulation is cut so that it can be merely slipped into the bottom portion of the wood frame.

Still another object of this invention is to use an aluminum sheet which is alloyed with silicon and manganese as described in my U.S. Pat. No. 3314414 for a Traughs In A Pool Solar Collector; the aluminum pan turns black when water containing salt or fluoride is used in the pans and exposed to sunlight. It is to be pointed out that the apparatus of this invention has a design somewhat similar to my Traughs In A Pool Solar Collector; but, in principle, both are vastly different. The Traughs In A Pool Solar Collector has an air gap dividing three pans containing water, and accomplishes quick high temperatures through a combination of radiation, conduction, and convection. The device of this invention has only wood dividers running between four pans so as to strengthen the thin gage aluminum which forms the pans; it achieves only moderate temperatures, but in larger quantities; and accomplishes heating chiefly through radiation.

Another object of this invention is to provide a glass panel which has a frame that can be easily formed, glazed, and fastened to the basic structure. The rubber gasket shown in the drawings meets all these requirements: it can be extruded in one piece at extremely cheap costs; it has cleverly designed rabbets which permits quick glazing; and rubber cement can be used to glue it to the wood frame of the chiller. To further speed up glazing, a liquid glazing compound is merely poured into the rabbets, acting as a lubricant as well as a sealer, and the glass panes slip in place very easily.

Still another object of this invention is to eliminate the cost of expensive welding and cutting so as to install piping that will fill up all the pans and drain away the water. In the design of this combination solar water heater and chiller, all water enters through the upper portion of the chiller frame; and, in the case of the drain line, the piping is then dropped down to the lowest part of the pan so a suction pump can syphon or suck out all the water. Such an arrangement results in the savings of several dollars on every unit that is built.

The above and other objects and features of this invention will be apparent to those skilled in the art to which this invention pertains from the following detailed description and the drawings, in which:

FIG. 6 is a view in section of the double-glazed glass panel which will be added to the top of the chiller to convert it into a solar water heater.

FIG. 7 is a view in side elevation showing the insulating panel which will be added to the bottom of the chiller to convert it into a solar water heater.

FIG. 8 is a view in section showing an extruded rubber gasket having two rabbets to provide for double-glazing, which will serve as the window frame for the solar water heater.

FIG. 9 is a view in section showing an extruded rubber gasket having only a single rabbet, which will provide for single glazing if such a glass panel is desire.

FIG. 10 is a view in section showing a flexible rubber moulding which will be glued both to the extruded rubber gasket and the upper portion of the wood exterior frame to prevent heat losses from the solar water heater.

FIG. 11 is a schematic view of two glass panels, as seen from the sky, that are glued to the upper portion of the exterior wood frame of the chiller and to a wood top-support which runs through the center of the chiller.

FIG. 12 is a view in section showing a solar water heater which was transformed from a chiller by adding a glass panel to the top and an insulating panel to the bottom.

FIG. 13 is a schematic view in section showing how a solar water heater can be set on the ground and tilted to face toward the Sun, thus permitting the maximum amount of sunlight to enter it.

FIG. 14 is a view in section of a wood window frame designed for double glazing, which could replace the extruded rubber gasket if it could be manufactured and glazed more cheaply.

FIG. 15 is a view in section of a bank of four aluminum extruded pans, which could replace the singlely formed pans and wood dividers if the extruded article could be manufactured more cheaply and serve the same purpose as the others.

Figure 1:
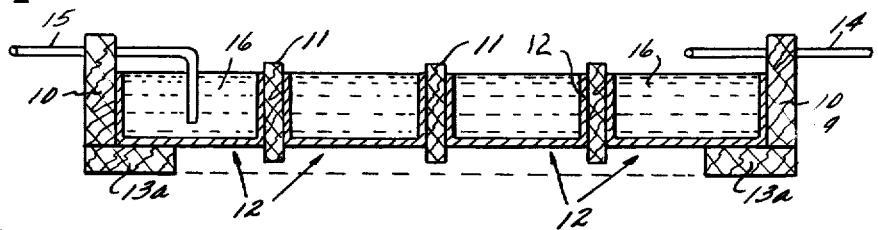
FIG. 1 is a view in section of a solar water chiller, or basic structure, showing a bank of four narrow and shallow aluminum pans contained within wood supporting members, and having means of filling the chiller with water and emptying it.

FIG. 16 is a schematic view showing a group of combination solar water heaters and chillers enclosed within a fenced area that will furnish heating and cooling for an adjoining office building; also shown are three water storage tanks which are buried in the ground and which store or re-handle the hot or chilled water. Automatic controls are provided to fill and drain the heaters and chillers and to pump and re-cycle the water to the various storage tanks into the office building.

FIG. 17 is an enlarged view showing the fan unit, located in the mechanical room of the office building, its components, controls, and duct work which could not be shown in FIG. 16.

In the following detailed description and the drawings, like reference characters indicate like parts.

In FIGS. 1 through 5 is shown how a solar water chiller 9 is constructed so it can serve as a basic structure for a combination solar water heater and chiller. In FIGS. 1, 2, 3, and 5 is shown a 2 inches × 4 inches wood member which forms the exterior frame 10 of the chiller 9, providing the structural strength to support 8⅓ pounds of water per square foot of chiller area, which would amount to approximately 125 pounds of water in a chiller whose size is 2 feet by 8 foot.

Figure 2:
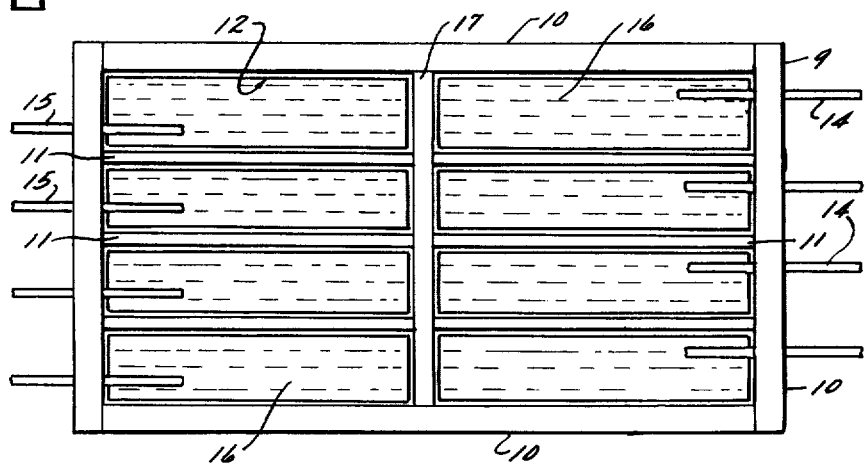
FIG. 2 is a schematic view of a solar water chiller, as seen from the sky, showing an arrangement of narrow pans contained within wood supporting members, and having means of filling and emptying the chiller.
Figure 3:
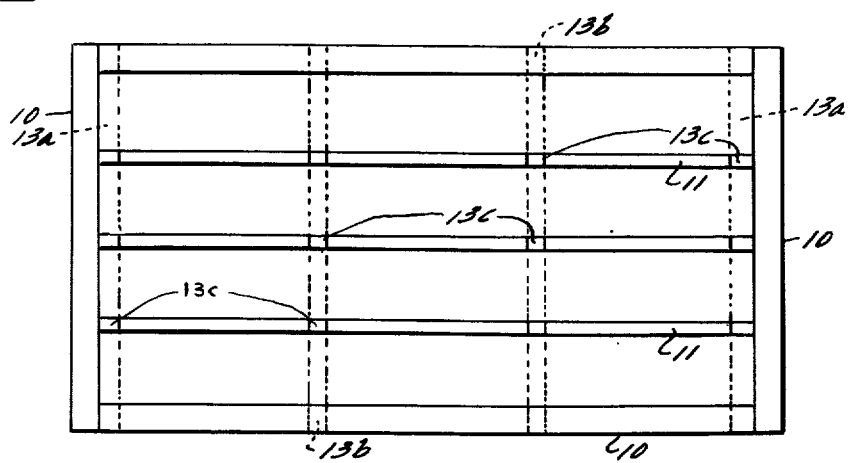
FIG. 3 is a schematic view of the wood structural frame for the chiller, showing the wood exterior frame, wood dividers, and bottom supports which are routed out so the wood dividers can slip into them and be held firmly in place.
Figure 4:
FIG. 4 is a view in section of one of the four wood bottom supports, showing how it is routed out to hold the wood dividers in place, while at the same time bracing the entire exterior frame to which it is fastened.
Figure 5:
FIG. 5 is a view in front or rear elevation depicting the exterior appearance of the chiller, lengthwise, and showing the four wood bottom supports attached to the wood exterior frame of the chiller.

In FIGS. 1, 2, and 3 are shown wood dividers 11 which serve as a structural support for four thin gage, narrow, shallow and uncovered aluminum pans 12 shown in FIG. 1. In FIGS. 1, 3, 4, and 5 are shown wood bottom supports 13a and 13b which brace the aluminum pans 12 from the bottom and which are provided with routed out groove 13c which permit wood dividers 11 to be slipped into them and be held firmly in place. Groove 13c, shown in FIG. 4 only as a feature of bottom-support 13b, is also shown in FIG. 3, and is a feature of both bottom-supports 13a and 13b. The four pans 12 shown in FIG. 1 each have a supply pipe 14 running into them so they can be filled with water 16; on the opposite side of the chiller 9 is a drain pipe 15 so water 16 can be removed after it is either heated or chilled. In FIG. 1 is shown how drain pipe 15 is constructed so that water 16 can be drained out of all the pans by a suction pump, thus eliminating the necessity of welding a pipe to the bottom of the pans to accomplish drainage. Pan 12 will be made from thin gage aluminum sheet or coil that contains 2% silicon and 1% manganese alloyed with it, so the light shiny metal will turn black as described in my U.S. Pat. No. 3,314,414. FIG. 2 shows top-support 17 which is fastened to dividers 11 and wood frame 10, thus serving as a brace for these members and also serving as a foundation in the center of the chiller upon which can be mounted rubber window frame 18 that is shown in FIGS. 6, 8, 9, 11, 12, and 13.

In FIGS. 6 and 7 are shown the glass panel 18 and insulating panel 19 which will be added to the basic structure (water chiller 9) to convert it into a combination solar water heater and chiller. When these two panels are added to the water chiller 9, it becomes a solar water heater 20 as shown in FIGS. 12 and 13. Glass panel 18 is comprised of an extruded rubber gasket 18a, a flexible rubber moulding 18d, and glass sheets 18e. Insulating panel 19 is comprised of a sheet of rigid boardform insulation 19a such as styrofoam, eurethane, or fiberglass, which will be slipped into a channel-type metal frame 19b that will be fastened to the bottom of water chiller 9.

FIGS. 8, 9, 10, and 11 show a detailed configuration of extruded rubber glazing gasket 18a and 18aa, and flexible rubber moulding 18d, and how they are assembled together with glass sheets 18e to form glass panel 18. In FIG. 8 is shown extruded rubber gasket 18a which is designed for double glazing; it has two rabbets 18b, each of which accept a single sheet of glass 18e; at the base of each rabbet 18b, there is a deeper recess 18c, which is provided to help in the glazing by making it easier to bend the rubber gasket 18a outward so the glass 18e will slip into the rabbet 18b much more easily. In FIG. 9 is shown extruded rubber gasket 18aa which is designed for single glazing; it has only one rabbet 18b; and at the base there is a deeper recess 18c. In FIG. 10 is shown flexible rubber moulding 18d, which acts as a weather stripping around the base of glass panel 18 to prevent heat from escaping. FIG. 11 gives a view of two glass panels 18 which are glued with rubber cement to the upper portion of exterior frame 10 and top-support 17; glass sheets 18e are fitted into extruded rubber gasket 18a; and flexible rubber moulding 18d is glued with rubber cement to both the wood frame 10 and the rubber gasket 18a. A liquid glazing compound 18f (not shown on the drawings) will be used to seal the glass sheets 18e to the rubber gasket 18a.

FIGS. 12 and 13 show a solar water heater 20, which was created by adding glass panel 18 and insulating panel 19 to the water chiller 9 shown in FIG. 1. All the components of the water chiller 9 now serve to help heat water by sunlight; as the Sun shines through the glass panel 18, its infrared rays are absorbed by the black color which has been oxidized on the shallow, narrow, thin gage aluminum pan 12; the wood frame 10, wood dividers 11, and bottom supports 13a and 13b brace the aluminum pans 12 so they can hold their shape and contain the water 16. Insulating panel 19 and glass panel 18 help prevent heat losses from the solar water heater 20. FIG. 13 shows how the solar water heater 20 can be tilted toward the Sun in winter when it is far off in the southern skies; this is accomplished merely by placing a wood block 21 under the bottom-support 13a; the front portion of the water heater 20 will rest directly on the earth 22. FIG. 13 clearly illustrates the practicality of narrow aluminum pans 12 that was designed for the water heater 20; if only one wide pan were used to cover the entire bottom and sides of the water heater 20, little water could be held in it because the steep pitch would make it overflow at the lower end; but, as designed, about three times as much water can be exposed to sunlight, and more energy can be collected.

It is the intent of this invention that other materials could be used to make the combination solar water heater and chiller so long as they duplicate the general design shown on the drawings. FIG. 14 shows a wood frame 18aw which could be used to replace extruded rubber gasket 18a. FIG. 15 shows how aluminum could be extruded to match the general design of the narrow pan 12; the extruded combination of pans 12a would eliminate the wood dividers 11 and the routing of the grooves 13c in bottom support 13a and 13b. In solar tests conducted this summer, plastic was used as a transparent panel to cover the top of solar collectors, and they served just as well as glass in preventing heat losses; therefore, plastics or any other type of transparent panel could be used to replace glass if costs warranted it.

FIG. 16 shows a group of combination solar water chillers 9 or water heaters 20 enclosed within a fenced area 23; only a few devices are shown on the drawing, but under field conditions as many as a thousand might be so enclosed. The chillers 9 or water heaters 20 will be filled with water by supply pipe 24, and emptied of water by drain pipe 25. Automatic controls will be used to fill and drain the solar devices and to assure that the maximum amount of water will be heated or chilled within a day's time; to accomplish this, adjustable timers will be used to control the flow of water into and out of the solar devices at specific periods during the day or night, as this will permit several batches of heated or chilled water to be made; and this batching system has been proven to provide the maximum BTU's of energy within a day's time. No specific temperatures are sought, except that on the drain line a temperature control will be located in one master water heater or chiller, so that on cloudy or rainey days in winter, or on extremely hot nights during summer, no hot or cold water will be drained into the storage tank that is unfit for use; through experience, it will be possible to preset the timers for a long enough period to yield 120°F to 145°F temperatures throughout the year. To provide for ample storage of energy in the form of hot or chilled water, two large tanks and one small tank will be provided. Heated or chilled water will be drained into a large water storage tank, hereinafter called energy storage tank 28, capable of holding 25,000 to 100,000 gallons of energized water, so that a large group of homes in a subdivision or a large commercial building can be made comfortable in winter and summer; after this heated or chilled water has been used to accomplish its purpose, the water will be re-cycled to another large storage tank, hereinafter called de-energized water storage tank 31 for re-use in the system; a small tank 29 will be connected to energy storage tank 28 containing the heated or chilled water, and its purpose will be to act as a temporary storage near the building so that the heated or chilled water will not be standing in piping where it will dissipate all its energy into the ground instead of into the buildings. FIG. 16 also shows an office building 32 having several offices to be heated and cooled. The comfort system for the building will consist of a fan-unit and automatic controls, which will supply hot or cold water to the fan-unit and periodically drain or re-fill it so that a continuous flow of hot or cold air can be made by the fan-unit and be distributed to the offices by an air duct system.

FIG. 16 shows how the chiller 9 or water heaters 20 will be automatically filled and drained through the use of automatic controls. A valve 26b and a pump 26c are installed in the main trunk line of supply pipe 24, thus making it possible to fill all the solar devices within fenced area 24 through the use of one pump and one valve. Timer 26a will be connected to both valve 26b and pump 26c; and, depending upon the season, will be set to pump in new water from de-energized water storage tank 31 twice to several times a day or night. When the chillers 9 or water heaters 20 are filled, a float switch 26d, located in one master solar unit, will close valve 26b and shut off pump 20c. Next, the water in all the solar devices will be either heated or cooled, depending upon the season; after this has been accomplished, timer 27a will open valve 27b and start suction pump 27c, which will remove all the heated or chilled water from the solar devices through drain pipe 25, and pump it into energy storage tank 28. If it is winter, timers 26a and 27a will be set to fill and drain the solar devices about twice a day, starting with one batch around 9 o'clock in the morning, draining it around noon, putting in a second batch shortly after noon, and draining it again around 4 o'clock in the afternoon. If it is summertime, timers 26a and 27a will be set to fill and drain the solar devices at two hour intervals; and each time the temperature of the water will reach 45°F to 65°F or whatever the night temperature happens to be. If it is cloudy or rainy or snowing in winter or if it is too hot in summer and one of the batches is not brought to a useable temperature, temperature sensor 27d, located in one master solar unit, will not permit timer 27a to function until the designated temperature is achieved.

FIGS. 16 and 17 show how the office building 32 will be heated and cooled through the use of automatic controls. Hot or cold water will remain in the energy storage tank 28 until the thermostat 33 in the office building 32 calls out for heating or cooling. Thermostat 33 is tied-in with fan unit 34 and all the controls which move energized water into the radiator 34e and out into de-energized storage tank 31; it also controls, indirectly, pump 30b, which takes water out of energy storage tank 28 and pumps it into small storage tank 29; a float switch 30a in small storage tank 29 starts pump 30b after pump 36b has nearly emptied small storage tank 29 by moving energized water into radiator 34e. It is estimated that to cool office building 32, which, let us say, is a structure of 35,000 square feet, that 9,000 gallons of chilled water per hour will have to be pumped through fan unit 34, which is comprised of a motor 34a, a fan 34b, a fan shroud 34c, a filter 34d, and a radiator 34e; this means that the radiator 34e would have to be quite large and that, actually, several of them would be required to dissipate the chill in 9,000 gallons of cooled water every hour of a summer day; it also means that frequent changes of water will be required each hour. Such an undertaking will be accomplished in the following fashion: — as long as the temperature set on the thermostat 33 is not satisfied, timer 35a will remain energized, and it will pass through one cycle after another; first, to open and shut valve 35b and start and stop pump 35c to drain all the water out of the radiators 34e; next, it will start motor 34a, which in turn will move fan 34b, which will blow air through filter 34d and radiator 34e; almost simultaneously with the starting of the fan unit 34, timer 35a will open valve 36b, and start pump 36a, which will pump chilled water from small storage tank 29 into radiator 34e; when this has been accomplished, the timer cycle will automatically close valve 36b and stop pump 36a. The fan unit 34 will take perhaps a minute to dissipate all the chill in the water up into the plenum 37a, from thence into ducts 37b, and finally out into the offices through diffuser 37c. At this point, timer 35a will start passing through another cycle such as described above; this will occur when a temperature sensor 35d, located in the plenum 37a, says that the air passing by it is too warm; and will then energize the timer 35a so it will start its cycle. Water is now removed from the radiator 34e, as described above, and passes through drain pipes 38 into de-energized storage tank 31, where it will remain until the next day or night when it will be pumped into the solar devices in the fenced area 33, where it will be heated or chilled, depending upon the season of the year.

Having described my invention, what I claim as new and desire to secure by Letters Patent, is:

1. A method for heating, cooling, and handling water to make buildings comfortable throughout the year by employing a semi-stationary basic structure to cool water, and, seasonally, adding extra pieces of material so the basic structure can serve to heat water, comprising, in combination, affixing within supporting members a bank of narrow and shallow and uncovered containers that act as the basic structure to chill water during summer, and employing the same basic structure with a transparent panel and insulating cover added to the top and bottom respectively to heat water during winter, suspending or tilting said uncovered containers so the top and bottom are completely surrounded by cool summer night air and thus chilling it, tilting said covered containers to face toward the Sun in winter so as to heat water, periodically filling and emptying said containers by automatically controlling the flow of water into and out of them through piping that does not pierce the bottom or lower portion of said containers, said emptying occurring through syphoning or suction, storing said heated or chilled water until needed, periodically pumping said heated or chilled water into a radiator that is interjected in an air duct system installed in the buildings, blowing air through the radiator and causing heat or cold to flow into the rooms of the buildings, said pumping and blowing being controlled automatically, removing the de-energized water to a storage area, and periodically throughout the day or night moving energized and de-energized water in an endless cycle between the buildings and the various storage areas and a fenced area containing large numbers of said combination solar structures.

2. A method for heating and cooling a group of buildings comprising, in combination, alternately by season, adding and removing a few materials from a basic structure so that by interchanging materials two different solar phenomina result, one which chills water by exposing it to cool night air, the other heating water by exposing it to sunlight, enclosing a large number of said interchangeable structures within a fenced area, periodically filling and draining said structures after water has been heated or chilled to a satisfactory temperature, storing said heated or chilled water, pumping said heated or chilled water into a radiator and blowing air through it into a duct system so as to heat or cool all the rooms of the buildings, storing the de-energized water, chilling said water by using an interchangeable solar structure comprised basically of a bank of narrow and shallow and uncovered containers, modifying said solar structure seasonally and alternately by applying a transparent panel to the top and an insulating cover to the bottom so as to seal it tight and prevent heat losses while exposing water to sunlight, said pumping of water and blowing of air being accomplished periodically by automatically controlling their flow by using control devices and related equipment.

3. A method for heating, cooling, and handling water so as to provide year-round comfort for a group of buildings, comprising, in combination, installing within a fenced area what is basically a group of chillers comprised of a bank of narrow and shallow and uncovered containers, tilting or suspending said chillers so they will be surrounded on the top and bottom by cool night air which causes the water temperature to drop to that of the atmosphere, seasonally adding an insulating transparent panel to the top and an insulating panel to the bottom of said chillers, then alternately removing and adding said panels with each passing season so that by the interchange of materials water can also be heated by exposing it to sunlight, periodically filling and emptying and storing the hot or cold water made in said fenced area and pumping it into radiators that are centrally located within an air duct system in the buildings to be heated or cooled, blowing air through the radiators and forcing hot or cold air through the ducts out into all the rooms in the buildings, and comprising the following sequence of operations: periodically throughout the day or night pumping de-energized water from a large storage tank especially designated for such water within a closed cycle of equipment into said interchangeable solar structures by using an automatic device which has been pre-set to automatically open and close the piping and start and stop a pump which moves said water through said piping from said large storage tank to said interchangeable solar structures, placing a control device within one of the interchangeable structures that closes the piping and stops the pumping after said structures are filled, periodically throughout the day or night pumping energized water made in said interchangeable solar structures into a large storage tank which is especially designated for such water by using an automatic device which has been pre-set to open and close the piping and start and stop a pump which moves said water through said piping from said interchangeable structures to said storage tank, placing a control device within one of the interchangeable structures which senses whether said water is hot or cold enough and which either permits or delays the drainage of water from said interchangeable structures, installing a temperature control device within the buildings to be heated or cooled that automatically controls other automatic devices which control the flow of water and air through the buildings and comprising the following sequence of operations: periodically throughout the day or night pumping energized water from said large storage tank into a small storage tank near the buildings by using a control device inside the small tank which starts a pump when said tank is nearly empty, setting the main temperature control at a desired temperature for keeping the buildings comfortable throughout the day and night and connecting it to an automatic device which has been pre-set to automatically open and close the piping and start and stop a set of pumps which brings energized water to and carries de-energized water away from a radiator that is centrally located in an air duct system and which simultaneously runs a motor-fan unit which blows air through the radiator and air ducts and forces hot or cold air into all the rooms of the buildings, installing a temperature sensing device in the plenum of the air duct system and connecting it to the automatic device which is pre-set to automatically open and close the piping and start and stop the pumps and run the fan unit which blows air through the radiator and duct system so that all these devices continue to re-cycle until all the rooms in the buildings are heated or cooled to the temperature set on the main temperature control, and repeatedly throughout the day and night continuing the above cycles so that the buildings will always remain comfortable.

4. A combination solar water heating and chilling apparatus that can be used to keep buildings comfortable throughout the year, which is comprised of a semi-stationary basic structure that is essentially a water chiller and which can be converted into a water heater by adding an insulating transparent panel to the top and an insulating cover to the bottom, said water chiller being comprised of a bank of thin gauge, narrow, shallow, and uncovered metal pans which are held within an open-type supporting structure, said water heater being comprised of the same bank of metal pans and supporting structure as the chiller plus a transparent cover on the top and an insulating cover on the bottom, said water chiller cooling water by exposing it to the chilly night air during summer, said water heater heating water by exposing it to sunlight during winter, said pans having a base and walls extending upwardly from said base and an upper portion that is uncovered, means for tilting or suspending said chiller so it will be surrounded on the top and bottom by chilly night air, means for resting said water heater on the ground and tilting it so it will face toward the sun, means for filling and emptying said combination apparatus automatically, means for enclosing a large group of said combination solar water heaters and chillers in an outdoor area so it is possible to provide heating and cooling for several buildings, means for automatically controlling the flow of water into and out of said group of devices through the use of one set of automatic controls for filling them and one set for emptying them, means for storing energized and de-energized water, means for automatically controlling the flow of water into and out of the buildings to be heated and cooled through the use of only one set of automatic controls just before said water enters a radiator and only one set of automatic controls just after said water leaves the radiator, said radiator being the means of converting hot or cold water into hot or cold air, means for automatically controlling a fan unit which blows hot or cold air through air ducts connected to the radiator, means for continuously supplying hot and cold water to the radiator by placing a temperature sensor in the plenum chamber that will control an automatic timer which will repeatedly cycle water through the radiator whenever the temperature sensor says that the air is not hot or cold enough, and means for automatically controlling all the automatic operations within the building heating and cooling system through the use of a thermostat which controls the temperature inside the buildings and which instigates the continuous cycling or hot or cold water and air through a central heating-cooling system.

5. A combination solar water heater and chiller capable of heating and cooling water that can be used to keep buildings comfortable throughout the year, which is comprised of a basic structure that consists of a bank of thin gage, narrow, shallow, and uncovered aluminum pans which are held within a wood framework, said aluminum being alloyed with silicon and manganese to make it turn black, said wood framework consisting of an exterior frame, a series of dividers running longitudinally with the pans, a top-support located centrally on top of said dividers, and a group of bottom-supports with grooves in them to secure the dividers, all said members of the wood framework being fastened to one another and spaced apart from one another so that the maximum amount of water and metal will be exposed to the air on the top and bottom of said pans, means for filling and emptying said basic structure, said basic structure being fitted with drain piping and supply piping which do not pierce the bottom or lower side walls of said pans and with the drain piping protruding downward from the top to near the bottom of the pans so said water can be removed through syphoning or by suction, said basic structure being so designed that it can be converted into a solar water heater by adding an insulating glass panel to the top and a fibrous or granular insulating cover to the bottom, said glass panel comprised of a flexible rubber moulding and an extruded rubber gasket having two rabbets into which are fitted two sheets of glass, said rabbets having a deeper recess in one portion of their base which makes the gasket more plyable, means for fastening the glass panel to the basic structure, said fibrous or granular insulating cover consisting of a rigid boardform type of insulation which is fitted into a channel-type frame which is fastened to the bottom-supports of said basic structure.

6. A combination solar water heater and chiller similar to that described in claim 5 except that the extruded rubber gasket will have only one rabbet into which is set a single sheet of glass.

7. A combination solar water heater and chiller similar to that described in claim 5 except that the extruded rubber gasket will be replaced by a wood window frame provided with either a single glass stop or two glass stops which would be used for either single or double glazing.

8. A combination solar water heater and chiller used for heating and cooling a group of buildings, wherein a large number of said combination solar devices are enclosed in a fenced area on the ground somewhere close to the buildings to be heated and cooled and with means for handling and storing the great volume of energized water through the use of automatic controls, said combination solar device being comprised of a basic structure which is essentially a water chiller consisting of a bank of thin gage, narrow, shallow, and uncovered pans which are formed either by a press or a break, or through extrusion and affixed to an open-type supporting structure so the pans can be surrounded on the top and bottom by chilly night air, said basic structure being designed so it can be converted into a water heater by adding a glass panel to the top and an insulating cover to the bottom, said aluminum being alloyed with silicon and manganese so the pans will turn black when exposed to sunlight and a mixture of salt water or fluoride, said glass panel being comprised of a flexible moulding and an extruded rubber gasket having two rabbets into which are fitted two sheets of glass, said rabbets having a deeper recess in one portion of their base, means for fastening said glass panels and insulating cover to the basic structure, means for filling and emptying said combination solar devices which consists of a piping system into which has been interjected two sets of automatic controls one of which pumps water from a de-energized water storage tank into the basic structures and having a timer that has been pre-set to periodically open a valve installed in the piping system and starting a pump which moves said de-energized water into said basic structures and having a float switch in one master structure which closes said valve and stops said pump after all said pans are filled with water, a second set of automatic controls which pumps water from the basic structures into an energy storage tank and having a timer that has been pre-set to periodically open a valve and start a pump and having a temperature sensor in one master structure which determines if the water is hot or cold enough and which either permits or delays the drainage of water from all said structures into said energy storage tank, said basic structure being fitted with drain piping and supply piping which does not pierce the bottom or lower side walls of said pans, and with the drain piping protruding downward from the top to near the bottom of said pans.

9. A combination solar water heater and chiller having the same features as the apparatus described in claim 8, with the following features added: — means for automatically controlling the flow of energized water from said energy storage tank through the building and back to said de-energized water storage tank and repeating this cycle numerous times throughout the day or night so the buildings will be kept constantly comfortable, said means for automatically controlling the flow of energized water being a thermostat set at a temperature of approximately 75° Fahrenheit and located at a suitable place in the buildings, said thermostat being connected to a timer which is set to go through a series of cycles so as to automatically control the flow of water and air through a system of piping and air ducts, said timer cycle consisting of first opening a valve and starting a pump that removes de-energized water from a radiator or radiators to said de-energized water storage tank and then closing said valve and stopping said pump, and next almost simultaneously starting a fan unit that blows air through said radiators out into a duct system and then opening a valve and starting a pump that moves energized water from a small water storage tank into said radiators and then closing said valve and stopping said pump, said small water storage tank having a float switch which starts a pump that draws energized water from said energy storage tank into said small water storage tank, said radiators being interjected into an air duct system that runs through the buildings to be heated or cooled, said air duct system having a plenum mounted above said radiators which distributes energized air into the duct system, said plenum having a temperature sensor mounted on its walls which is connected to said timer and which starts said timer through another cycle when it senses that the air passing through the plenum is not hot or cold enough, the above cycles and sequences being repeated over and over again throughout the day as called for by the thermostat, the timer, and the temperature sensor.

* * * * *